(12) United States Patent
Karim et al.

(10) Patent No.: US 7,468,985 B2
(45) Date of Patent: Dec. 23, 2008

(54) SYSTEM INDEPENDENT AND SCALABLE PACKET BUFFER MANAGEMENT ARCHITECTURE FOR NETWORK PROCESSORS

(75) Inventors: Faraydon O. Karim, San Diego, CA (US); Ramesh Chandra, San Diego, CA (US); Bernd H. Stramm, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 989 days.

(21) Appl. No.: 10/290,766

(22) Filed: Nov. 8, 2002

(65) Prior Publication Data

US 2003/0123454 A1 Jul. 3, 2003

Related U.S. Application Data

(60) Provisional application No. 60/345,107, filed on Dec. 31, 2001.

(51) Int. Cl.
*H04L 12/28* (2006.01)
*H04L 12/56* (2006.01)
*G06F 9/26* (2006.01)

(52) U.S. Cl. .................. 370/412; 370/429; 709/245; 711/200; 711/216

(58) Field of Classification Search ......... 370/412–418, 370/428, 429; 709/245; 711/200, 216
See application file for complete search history.

(56) References Cited

U.S. PATENT DOCUMENTS

| 5,377,340 | A | * | 12/1994 | Seroussi et al. | ............... 711/5 |
| 5,454,089 | A | | 9/1995 | Nguyen et al. | |
| 5,826,041 | A | | 10/1998 | Ogus | |
| 6,434,148 | B1 | * | 8/2002 | Park | ............... 370/394 |
| 2001/0020941 | A1 | * | 9/2001 | Reynolds | ............... 345/422 |
| 2002/0156990 | A1 | * | 10/2002 | Chen | ............... 711/219 |

\* cited by examiner

*Primary Examiner*—Ronald Abelson
(74) *Attorney, Agent, or Firm*—Lisa K. Jorgenson; William A. Munck

(57) ABSTRACT

A circular buffer storing packets for processing by one or more network processors employs an empty buffer address register identifying where a next received packet should be stored, a next packet address register identifying the next packet to be processed, and a packet-processing address register within each network processor identifying the packet being processed by that network processor. The n-bit addresses to the buffer are mapped or masked from/to the m-bit packet-processing address registers by software, allowing the buffer size to be fully scalable. A dedicated packet retrieval instruction supported by the network processor(s) retrieves a new packet for processing using the next packet address register and copies that into the associated packet-processing address register for use in subsequent accesses. Buffer management is thus independent of the network processor architecture.

19 Claims, 2 Drawing Sheets

US 7,468,985 B2

SYSTEM INDEPENDENT AND SCALABLE PACKET BUFFER MANAGEMENT ARCHITECTURE FOR NETWORK PROCESSORS

This application claims priority to U.S. provisional application no. 60/345,107 filed Dec. 31, 2001, the content of which is incorporated herein by reference.

TECHNICAL FIELD OF THE INVENTION

The present invention is directed, in general, to packet buffer management and, more specifically, to a scalable structure and operation for packet buffer management within a network processor.

BACKGROUND OF THE INVENTION

Network processors are dedicated processors that act as programmable packet forwarding engines for network routers. Since these processors have to interact with the packet buffers for packet forwarding or routing, the design of network processors is typically closely tied to the design of the overall routing system. Normally packet buffer management is closely related to the system architecture and is designed to suit the packet buffer size, packet queuing algorithms, and buffer allocation and deallocation techniques employed, as well as any other specific issues relating to packet processing.

To achieve contemporary wire speed packet processing and efficient usage of available memory resources, an effective technique for managing packet buffers in networking environments and buffer management scalable to the varying needs of system requirements are both essential.

There is, therefore, a need in the art for a system independent and scalable packet buffer management architecture for network processors.

SUMMARY OF THE INVENTION

To address the above-discussed deficiencies of the prior art, it is a primary object of the present invention to provide, for use in a router, a circular buffer storing packets for processing by one or more network processors and employing an empty buffer address register identifying the buffer entry into which a next received packet should be stored, a next packet address register identifying the buffer entry containing the next packet to be processed, and a packet-processing address register within each network processor identifying the buffer entry containing the packet being processed by that network processor. The empty buffer address register and the next packet address register are incremented when a new packet is received and stored or when processing of a packet by a network processor is initiated, respectively. The n-bit addresses to the buffer entries are mapped or masked from/to the m-bit packet-processing address register(s) within the network processor(s) by software, allowing the buffer size to be fully scalable. A dedicated packet retrieval instruction supported by the network processor(s) accesses a new packet for processing using the next packet address register, and copies the content of the next packet address register into the packet-processing address register within the respective network processor for use in subsequent accesses by that network processor. Upon completion of packet processing, the network processor invalidates the content of the associated packet-processing address register and signals the circular buffer, which marks the respective buffer entry as empty for re-use. Buffer management is thus independent of the network processor architecture.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 3A-3C, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
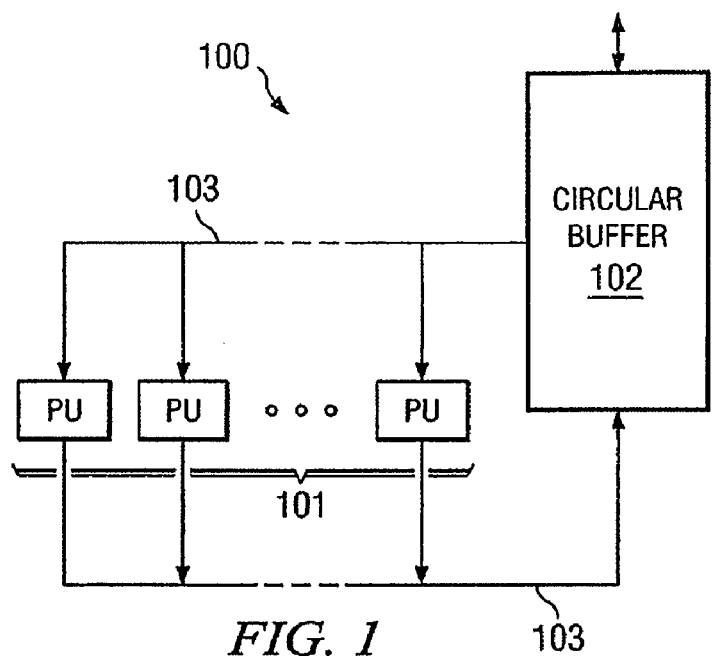
FIG. 1 depicts a processing system implementing a system independent and scalable packet buffer management architecture according to one embodiment of the present invention.

FIG. 1 depicts a processing system implementing a system independent and scalable packet buffer management architecture according to one embodiment of the present invention. Processing system 100 includes one or more programmable packet-processing units (PU) 101 coupled to each other and to a circular buffer 102 by an interconnect 103. Circular buffer 102 may also include a port for receiving and/or transmitting packets to external systems.

The principle problem addressed by the present invention is the independence of packet processing architecture at the network processor level from the packet buffer management architecture at the router design level. The present invention allows such independence both in terms of functionality and buffer size scalability, as described in further detail below.

Figure 2:
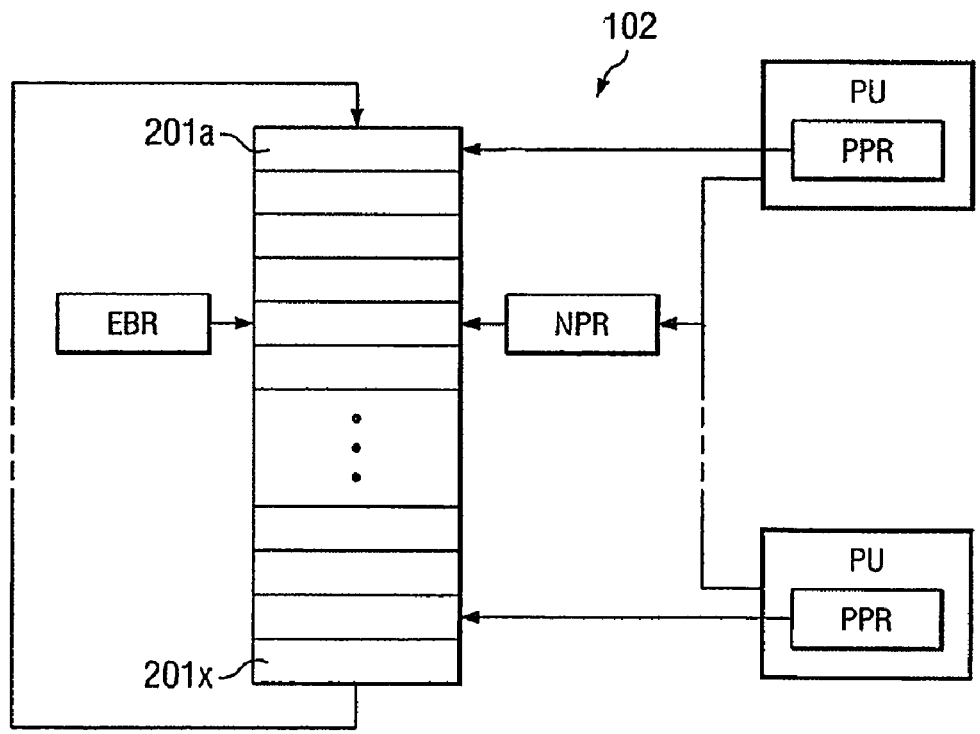
FIG. 2 depicts in greater detail a system independent and scalable packet buffer management architecture according to one embodiment of the present invention.

FIG. 2 depicts in greater detail a system independent and scalable packet buffer management architecture according to one embodiment of the present invention. The circular buffer structure 102 includes a set (queue) of $2^n$ buffer entries 201a-201x linked in circular fashion, where n is an arbitrary positive integer less than 32 in the exemplary embodiment. Entries 201a-201x within the set store packet header information, with packet payload data stored in separate associated memory (not shown) in the exemplary embodiment rather than within the entries themselves.

Three address pointer registers are employed: a single empty buffer register EBR containing an address pointing to the next available location in the circular buffer 102 and used to write a new packet header to the circular buffer; a single next packet register NPR containing an address for a location in the circular buffer 102 for reading a packet header; and a packet pointer register within each packet-processing unit 101 containing an address for a packet being processed by a respective processing unit.

The address pointer registers EBR and NPR are of a size $n \leq 32$ bits and are thus scalable with the size of the circular buffer 102 (the number of buffer entries) designed at the network processor level. The packet buffer addresses stored within the address pointer registers PPR within each processing unit are always 32-bit values in the exemplary embodiment, and are thus independent of the network processor level configuration. The instruction set architecture (ISA) for each processing unit 101 includes an instruction get_packet for retrieving packet header information from the circular buffer 102 as described in greater detail below.

Figure 3A:
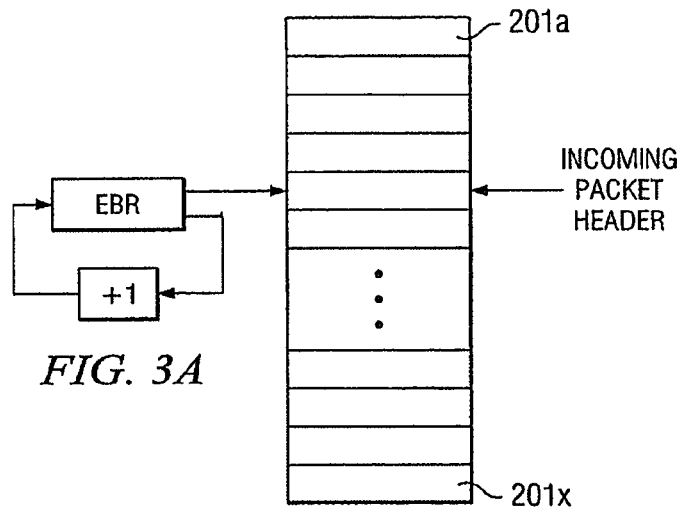
FIGS. 3A through 3C are diagrams illustrating allocation and access of packet information within a system independent and scalable packet buffer management architecture according to one embodiment of the present invention.
Figure 3B:
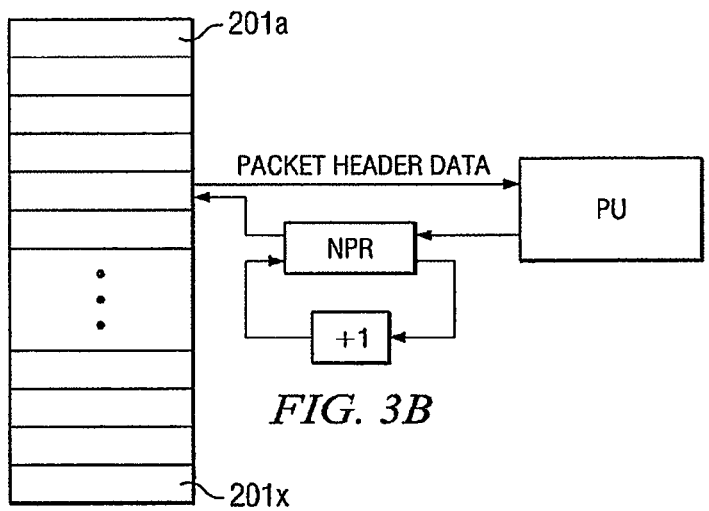
Figure 3C:
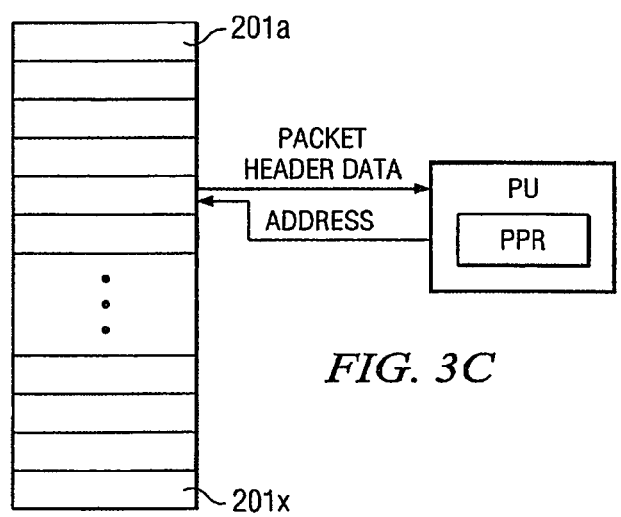

FIGS. 3A through 3C are diagrams illustrating allocation and access of packet information within a system independent and scalable packet buffer management architecture according to one embodiment of the present invention. As illustrated in FIG. 3A, when a new packet enters the processing system 100, the packet header is written at the address pointed to by the content of address pointer register EBR and the value of the address within register EBR is incremented to point to the next location in the circular buffer 102.

As illustrated in FIG. 3B, when any particular processing unit from the pool of packet-processing units 101 within the processing system 100 is ready to process another packet, that processing unit uses the address of the next packet within the circular queue to be processed that is contained within the address pointer register NPR. The value of address pointer register NPR essentially tracks the value of address pointer register EBR with possibly some latency.

As a result of executing the get_packet instruction, the processing unit receives the appropriate packet header from the circular buffer 102 together with a copy of the contents of address pointer register NPR (prior to incrementing). The first four words of the received packet header, as well as the address received from the address pointer register NPR, are stored internally by the receiving processing unit. The value within the address pointer register NPR is also incremented to point to the next location within the circular buffer 102.

As illustrated in FIG. 3C, during all further processing performed on the received packet header, the get_packet instruction executed within the receiving processing unit provides the first four words of the header and uses the internally stored value from address pointer register PPR to access the remainder of the packet header from the circular buffer 102. Software mapping or masking of the 32-bit address pointer register PPR within the processing unit is employed to obtain the n-bit address value employed by the circular buffer 102. At termination of packet processing, the processing unit simply marks the internally stored information relating to the packet as invalid and transmits a signal to the circular buffer 102. In response to the termination signal, the circular buffer 102 marks the buffer entry empty to enable re-use.

The present invention stores circular buffer addresses for packets within a processing unit and includes dedicated instructions to access packet buffer entries using the internally stored 32-bit address values. The design of the processing unit architecture is thus independent of packet buffer management at the processing system (router) level. The router may use any suitable buffer allocation and usage technique depending on the overall router design.

In addition, the circular buffer size is completely scalable at the network processor level and may be selected for a particular implementation based on router size and traffic volume handled. The processing unit(s) (network processors) within the router simply treat the buffer addresses as 32-bit numbers through software, which may be easily mapped or masked to specific-size buffer addresses employed by the circular buffer. Overall this technique permits optimized design of the processing units (network processor) with sufficient programmability and efficiency of packet processing, and with configurability and scalability at the router level.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A packet storage subsystem comprising:

a buffer containing a plurality of entries each uniquely addressed by an n-bit address; and an m-bit packet-processing address register employed by a processing unit to store an address for a packet being processed by the processing unit, wherein an m-bit address value within the packet-processing address register is mapped or masked to produce an n-bit address for a buffer entry containing the packet being processed, wherein each of a plurality of processing units sharing access to the buffer has an associated m-bit packet-processing address register employed by the respective processing unit to store an address for a packet being processed by that processing unit, wherein m-bit address values within each packet-processing address register are mapped or masked to produce an n-bit address for a buffer entry containing the packet being processed, wherein the buffer is a circular buffer, the packet storage subsystem further comprising:

an empty buffer address register containing an address for a buffer entry into which a next packet received for processing should be stored; and a next packet address register shared by all processing units having access to the buffer and containing an address for a buffer entry in which a next packet to be processed is stored, and wherein m is different from n.

2. The packet storage subsystem according to claim 1, wherein the m-bit address value within the packet-processing address register is mapped or masked to produce the n-bit address by software executing within an associated processing unit.

3. A packet storage subsystem comprising:

a buffer containing a plurality of entries each uniquely addressed by an n-bit address; and an m-bit packet-processing address register employed by a processing unit to store an address for a packet being processed by the processing unit, wherein an m-bit address value within the packet-processing address register is mapped or masked to produce an n-bit address for a buffer entry containing the packet being processed, wherein each of a plurality of processing units sharing access to the buffer has an associated m-bit packet-processing address register employed by the respective processing unit to store an address for a packet being processed by that processing unit, wherein m-bit address values within each packet-processing address register are mapped or masked to produce an n-bit address for a buffer entry containing the packet being processed, wherein the buffer is a circular buffer, the packet storage subsystem further comprising:

an empty buffer address register containing an address for a buffer entry into which a next packet received for processing should be stored; and a next packet address register shared by all processing units having access to the buffer and containing an address for a buffer entry in which a next packet to be processed is stored.

4. The packet storage subsystem according to claim 3, wherein a processing unit accessing a buffer entry containing a packet to be processed for a first time employs an address value within the next packet address register, stores the address value from the next packet address register within an associated packet-processing address register, and subsequently accesses the buffer entry using the address value stored in the associated packet-processing address register until processing of the packet within the buffer entry is complete.

5. The packet storage subsystem according to claim 4, wherein the buffer entry containing the packet to be processed is accessed by the processing unit for the first time with a dedicated packet retrieval instruction employing the address value from the next packet address register.

6. A packet storage subsystem comprising:

a buffer containing a plurality of entries each uniquely addressed by an n-bit address; and an m-bit packet-processing address register employed by a processing unit to store an address for a packet being processed by the processing unit, wherein an m-bit address value within the packet-processing address register is mapped or masked to produce an n-bit address for a buffer entry containing the packet being processed, wherein each of a plurality of processing units sharing access to the buffer has an associated m-bit packet-processing address register employed by the respective processing unit to store an address for a packet being processed by that processing unit, wherein m-bit address values within each packet-processing address register are mapped or masked to produce an n-bit address for a buffer entry containing the packet being processed, wherein each processing unit having access to the buffer may selectively employ any buffer allocation and usage algorithm, independent of buffer management used by the buffer, and wherein the buffer is a circular buffer, the packet storage subsystem further comprising:

an empty buffer address register containing an address for a buffer entry into which a next packet received for processing should be stored; and a next packet address register shared by all processing units having access to the buffer and containing an address for a buffer entry in which a next packet to be processed is stored.

7. A router comprising:

one or more network processors;

a packet storage subsystem shared by the one or more network processors via an interconnect, the packet storage subsystem comprising:

a buffer containing a plurality of entries each uniquely address by an n-bit address; and an m-bit packet-processing address register employed by a network processor within the one or more network processors to store an address for a packet being processed by the network processor, wherein an m-bit address value within the packet-processing address register is mapped or masked to produce an n-bit address for a buffer entry containing the packet being processed, wherein each of the one or more network processors sharing access to the buffer has an associated m-bit packet-processing address register employed by the respective network processor to store an address for a packet being processed by that network processor, wherein m-bit address values within each packet-processing address register are mapped or masked to produce an n-bit address for a buffer entry containing the packet being processed, wherein the buffer is a circular buffer, the packet storage subsystem further comprising:

an empty buffer address register containing an address for a buffer entry into which a next packet received for processing should be stored; and a next packet address register shared by all processing units having access to the buffer and containing an address for a buffer entry in which a next packet to be processed is stored, and wherein m is different from n.

8. The router according to claim 7, wherein the m-bit address value within the packet-processing address register is mapped or masked to produce the n-bit address by software executing within an associated network processor.

9. A router comprising:

one or more network processors;

a packet storage subsystem shared by the one or more network processors via an interconnect, the packet storage subsystem comprising:

a buffer containing a plurality of entries each uniquely address by an n-bit address; and an m-bit packet-processing address register employed by a network processor within the one or more network processors to store an address for a packet being processed by the network processor, wherein an m-bit address value within, the packet-processing address register is mapped or masked to produce an n-bit address for a buffer entry containing the packet being processed, wherein each of the one or more network processors sharing access to the buffer has an associated m-bit packet-processing address register employed by the respective network processor to store an address for a packet being processed by that network processor, wherein m-bit address values within each packet-processing address register are mapped or masked to produce an n-bit address for a buffer entry containing the packet being processed, wherein the buffer is a circular buffer, the packet storage subsystem further comprising:
an empty buffer address register containing an address for a buffer entry into which a next packet received for processing should be stored; and
a next packet address register shared by all of the one or more network processors having access to the buffer and containing an address for a buffer entry in which a next packet to be processed is stored.

10. The router according to claim 9, wherein a network processor within the one or more network processors accessing a buffer entry containing a packet to be processed for a first time employs an address value within the next packet address register, stores the address value from the next packet address register within an associated packet-processing address register, and subsequently accesses the buffer entry using the address value stored in the associated packet-processing address register until processing of the packet within the buffer entry is complete.

11. The router according to claim 10, wherein the buffer entry containing the packet to be processed is accessed by the network processor for the first time with a dedicated packet retrieval instruction employing the address value from the next packet address register.

12. A router comprising:
one or more network processors;
a packet storage subsystem shared by the one or more network processors via an interconnect, the packet storage subsystem comprising:
a buffer containing a plurality of entries each uniquely address by an n-bit address; and
an m-bit packet-processing address register employed by a network processor within the one or more network processors to store an address for a packet being processed by the network processor, wherein an m-bit address value within the packet-processing address register is mapped or masked to produce an n-bit address for a buffer entry containing the packet being processed, wherein each of the one or more network processors sharing access to the buffer has an associated m-bit packet-processing address register employed by the respective network processor to store an address for a packet being processed by that network processor, wherein m-bit address values within each packet-processing address register are mapped or masked to produce an n-bit address for a buffer entry containing the packet being processed, wherein each of the one or more network processors having access to the buffer may selectively employ any buffer allocation and usage algorithm, independent of buffer management used by the buffer, wherein the buffer is a circular buffer, the packet storage subsystem further comprising:

an empty buffer address register containing an address for a buffer entry into which a next packet received for processing should be stored; and
a next packet address register shared by all processing units having access to the buffer and containing an address for a buffer entry in which a next packet to be processed is stored.

13. A method of operating a packet storage subsystem comprising:
storing received packets within a circular buffer containing a plurality of entries each uniquely address by an n-bit address;
mapping or masking an m-bit address value within a packet-processing address register employed by a processing unit to store an address for a packet being processed by the processing unit to produce an n-bit address for a buffer entry containing the packet being processed;
storing an address for a buffer entry into which a next packet received for processing within an empty buffer address register;
storing an address for a buffer entry containing a next packet to be processed within a next packet address register shared by all processing units having access to the buffer,
wherein m is different from n; and
accessing a buffer entry containing a packet to be processed for a first time utilizing a dedicated packet retrieval instruction employing an address value within the next packet address register.

14. A method of operating a packet storage subsystem comprising:
storing received packets within a circular buffer containing a plurality of entries each uniquely address by an n-bit address;
mapping or masking an m-bit address value within a packet-processing address register employed by a processing unit to store an address for a packet being processed by the processing unit to produce an n-bit address for a buffer entry containing the packet being processed;
mapping or masking m-bit address values within each packet processing address register associated with one of a plurality of processing units sharing access to the buffer and storing an address for a packet being processed by that processing unit to produce an n-bit address for a buffer entry containing the packet being processed;
storing an address for a buffer entry into which a next packet received for processing within an empty buffer address register; and
storing an address for a buffer entry containing a next packet to be processed within a next packet address register shared by all processing units having access to the buffer,
wherein m is different from n.

15. The method according to claim 14, further comprising:
mapping or masking the m-bit address value within the packet-processing address register to produce the n-bit address by software executing within an associated processing unit.

16. A method of operating a packet storage subsystem comprising:
storing received packets within a buffer containing a plurality of entries each uniquely address by an n-bit address;
mapping or masking an m-bit address value within a packet-processing address register employed by a processing unit to store an address for a packet being processed by the processing unit to produce an n-bit address for a buffer entry containing the packet being processed, wherein the buffer is a circular buffer, the method further comprising:

storing an address for a buffer entry into which a next packet received for processing within an empty buffer address register; and storing an address for a buffer entry containing a next packet to be processed within a next packet address register shared by all processing units having access to the buffer, wherein m is different from n.

17. The method according to claim 16, further comprising:

accessing a buffer entry containing a packet to be processed for a first time employing an address value within the next packet address register;

storing the address value from the next packet address register within a packet-processing address register associated with a processing unit that will process the packet; and subsequently accessing the buffer entry using the address value stored in the associated packet-processing address register until processing of the packet within the buffer entry is complete.

18. The method according to claim 17, further comprising:

accessing the buffer entry containing the packet to be processed for the first time utilizing a dedicated packet retrieval instruction employing the address value from the next packet address register.

19. A method of operating a packet storage subsystem comprising:

storing received packets within a circular buffer containing a plurality of entries each uniquely address by an n-bit address;

mapping or masking an m-bit address value within a packet-processing address register employed by a processing unit to store an address for a packet being processed by the processing unit to produce an n-bit address for a buffer entry containing the packet being processed;

selectively employing, within each processing unit having access to the buffer, any buffer allocation and usage algorithm, independent of buffer management used by the buffer;

storing an address for a buffer entry into which a next packet received for processing within an empty buffer address register; and storing an address for a buffer entry containing a next packet to be processed within a next packet address register shared by all processing units having access to the buffer, wherein m is different from n.

* * * * *